(12) United States Patent
Arnett (10) Patent No.: US 6,474,266 B1
(45) Date of Patent: Nov. 5, 2002

(54) PLANT ANCHOR

(75) Inventor: Jeffery A. Arnett, Creve Coeur, IL (US)

(73) Assignee: Sea Side Innovations LLC, Peoria, IL (US)

( * ) Notice: Subject to any disclaimer, the term of this patent is extended or adjusted under 35 U.S.C. 154(b) by 29 days.

(21) Appl. No.: 09/724,058

(22) Filed: Nov. 28, 2000

Related U.S. Application Data (63) Continuation-in-part of application No. 09/579,201, filed on May 27, 2000, now abandoned.
(60) Provisional application No. 60/141,959, filed on Jul. 1, 1999.

(51) Int. Cl.$^7$ .............................. A01K 63/00; A01G 5/04
(52) U.S. Cl. ....................................... 119/256; 47/41.13
(58) Field of Search ............................... 119/245, 246, 119/256; 47/41.12, 41.13, 41.14

(56) References Cited

U.S. PATENT DOCUMENTS

| | | | |
|---|---|---|---|
| 715,571 A | 12/1902 | Gillinder | ..................... 119/256 |
| 2,155,811 A | 4/1939 | Tredup | |
| 2,226,950 A | 12/1940 | Simpson | |
| 2,453,906 A | 11/1948 | Hamlet | |
| 2,486,932 A | 11/1949 | Elliott | |
| 2,531,562 A * | 11/1950 | Eve | ............................... 47/80 |
| 2,639,552 A | 5/1953 | Tredup | |
| 2,900,759 A | 8/1959 | Hutchinson | |
| 3,245,175 A | 4/1966 | Klingberg | |
| 3,424,641 A * | 1/1969 | Separa | ......................... 428/23 |
| 3,562,952 A | 2/1971 | Bramante | |
| D249,879 S | 10/1978 | Willinger | |
| 4,185,743 A | 1/1980 | Willinger | ..................... 206/423 |
| 4,291,499 A | 9/1981 | Prewer | ........................... 47/59 |
| 4,340,625 A | 7/1982 | Willinger | ..................... 428/17 |
| 5,257,596 A | 11/1993 | Jones | ......................... 119/256 |
| 5,375,370 A * | 12/1994 | Zimmerman | ................ 47/41.01 |
| 5,636,757 A * | 6/1997 | Porvaznik | ..................... 215/364 |
| 5,855,982 A | 1/1999 | Wechsler | ...................... 428/99 |
| 6,183,982 B1 * | 2/2001 | Nastasia | ....................... 435/41 |

FOREIGN PATENT DOCUMENTS

| | | |
|---|---|---|
| GB | 137123 | 1/1920 |
| GB | 507483 | 6/1939 |
| GB | 1276772 | 6/1972 |
| GB | 2021371 | 12/1979 |

OTHER PUBLICATIONS

DYNAFLEX® Thermoplastic Elastomer Compound Contains Kraton® Polymer Selector Guide, GLS Corporation 1996.

* cited by examiner

Primary Examiner—Robert P. Swiatek
(74) Attorney, Agent, or Firm—Husch & Eppenberger, LLC; Robert E. Muir (57) ABSTRACT

A plant anchor for securing a plant that includes a base member, having a top and bottom, and at least one support portion located within the base member and each support portion includes at least one opening for frictionally securing a plant. Preferably, there is more than one leg that is attached to the bottom of the base member. The base member as well as the legs can be in a wide variety of shapes and sizes. There can be more than one support portion located on each base member. The optimal opening is two transverse, v-shaped slits. In an alternative embodiment, the base member has a top portion having at least one support portion having an opening for frictionally securing a plant and downwardly extending flange, a middle portion including having a sidewall, and a bottom portion with upwardly extending flange wherein the downwardly extending flange of the top portion removedly engages the sidewall of the middle portion and the upwardly extending flange of the middle portion removedly engages the sidewall of the middle portion.

13 Claims, 9 Drawing Sheets

PLANT ANCHOR

CROSS-REFERENCE TO RELATED APPLICATIONS

This application is a continuation-in-part of U.S. patent application Ser. No. 09/579,201, filed May 27, 2000, now abandoned, which claims priority to Provisional Application No. 60/141,959, filed Jul. 1, 1999.

BACKGROUND OF THE INVENTION

Hobbyists have long desired aquatic scenery in aquariums as a desired effect for many years. This is to create a more natural environment for fish and tank inhabitants. However, aquatic scenery is extremely difficult to set-up and maintain. Plants are utilized in aquariums to accomplish a variety of functions. They provide a natural habitat for the fish, and, in addition, provide a means of protecting smaller fish in the aquarium from the larger fishes. The plants can utilize waste materials from fish and other animal life in the aquarium and in return provide oxygen and food for fish and the other organisms.

Although it has been long recognized that the presence of plants is a crucial aspect of any quality aquarium operation, the planting of an aquarium has heretofore been a very cumbersome and difficult task to carry out. Traditionally, aquariums have been planted by carefully covering the individual roots and lower stems of rooted plants. With non-rooted plants, even this approach has been of limited efficiency since, due to the absence of roots, the plants become easily loosened from the substrate, such as gravel and sand, and float to the aquarium surface.

It has been suggested that the best way in which both non-rooted and rooted plants may be securely planted is to weigh down the lower ends of the plants with small rocks or by wrapping lead strips to their stems. This is obviously cumbersome, inconvenient, and in the case of lead strips, toxic. Heretofore, lead strips have been commonly used due to the absence of satisfactory available alternatives.

A few rather complicated plant-holding devices do exist, but these devices do not fulfill the requirements of a live aquarium. U.S. Pat. No. 5,855,982, issued Jan. 5, 1999 to Wechsler, allows a variety of aquarium scenery to be secured to the bottom of an aquarium. However, this unit is expensive to manufacture and does not allow the use of an underground filter system that is widely used in the bottom of modern aquariums. An underground filter system pulls water through the underground filter through a lift tube and a water pump. Thus if the plant holding device disclosed in U.S. Pat. No. 5,855,982 is placed on top of a underground filter system then an undesirable depth of substrate, such as rock or sand, has to be used to cover over both devices, which would render the underground filter system useless.

U.S. Pat. No. 3,562,952, issued Feb. 16, 1971 to Bramante, is yet another device to hold aquarium scenery in place. As with U.S. Pat. No. 5,855,982, this device would seriously compromise the underground filter system which would require water to be pulled through the substrate and filtered. The base members of each variation of this device are flat, which blocks the flow of water. Also, there is too much substrate utilized to provide for the successful operation of an underground filter.

There have been other anchoring devices that have been patented, which include: U.S. Pat. No. 249,879, issued Oct. 10, 1978 to Willinger; U.S. Pat. No. 715,571, issued Dec. 9, 1902 to Gillinder; U.S. Pat. No. 2,155,811, issued Apr. 25, 1939; U.S. Pat. No. 2,486,932, issued Nov. 1, 1949 to Elliott; U.S. Pat. No. 2,639,552, issued May 26, 1953 to Tredup; U.S. Pat. No. 3,245,175, issued Apr. 12, 1966 to Klingberg; U.S. Pat. No. 4,185,743, issued Jan. 29, 1980 to Willinger; U.S. Pat. No. 4,340,625, issued Jul. 20, 1982 to Willinger; U.S. Pat. No. 5,257,596, issued Nov. 2, 1993 to Jones; and U.K. Pat. No. 2,021,371, issued May 30, 1978 to Willinger. These are only remotely similar to the present invention in that these devices vary from using rubber bands to secure plants to their devices, coiled springs to hold plant stems, and a flower pot plant holder.

The present invention is directed to overcoming one or more of the problems set forth above.

SUMMARY OF THE INVENTION

In one aspect of this invention, a plant anchor for securing a plant is disclosed. The plant anchor includes a base member and at least one support portion located within the base member and each support portion includes at least one opening for frictionally securing a plant.

In another aspect of this invention, a plant anchor for securing a plant is disclosed. This plant anchor includes a base member having a top portion having at least one support portion having an opening for frictionally securing a plant and downwardly extending sidewall, a middle portion having an upper flange portion and a lower flange portion, and a bottom portion with upwardly extending sidewall wherein said downwardly extending sidewall of said top portion removedly engages said upper flange of said middle portion and said lower flange portion of said middle portion removedly engages said upperwardly extending sidewall of said bottom portion, and at least one support portion located within said base member and each said support portion includes at least one opening for frictionally securing a plant.

In yet another aspect of this invention, a method for frictionally securing at least one plant is disclosed. The method includes securing the plant in at least one support portion located within a base member, having a top and bottom, with a plurality of legs attached to the bottom of the base member to allow use of a water filter without obstruction of water flow.

BRIEF DESCRIPTION OF THE DRAWINGS

For a better understanding of the present invention, reference may be made to the accompanying drawings in which.

DETAILED DESCRIPTION OF THE INVENTION

In the following detailed description numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
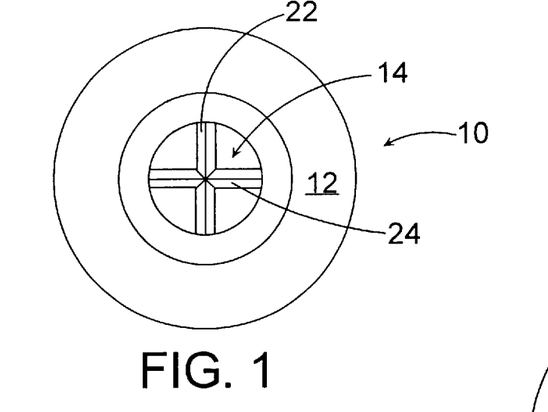
FIG. 1 is a top view of a first preferred embodiment of the plant anchor of the present invention utilizing a pair of slits.
Figure 1A:
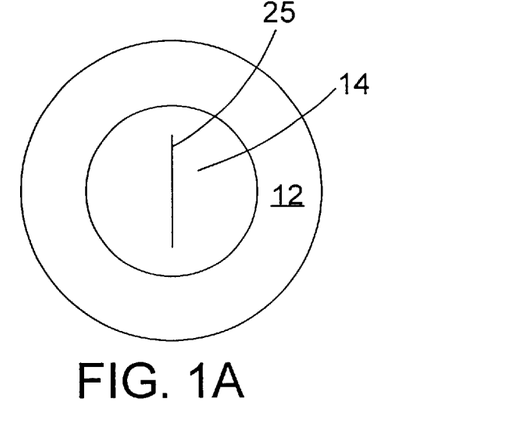
FIG. 1A is a top view of a plant anchor of the present invention utilizing a unitary slit.
Figure 2:
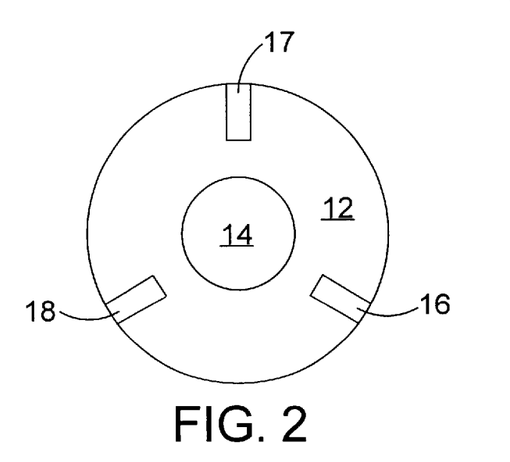
FIG. 2 is a bottom view of the first preferred embodiment of the plant anchor, shown in FIG. 1, of the present invention.
Figure 3:
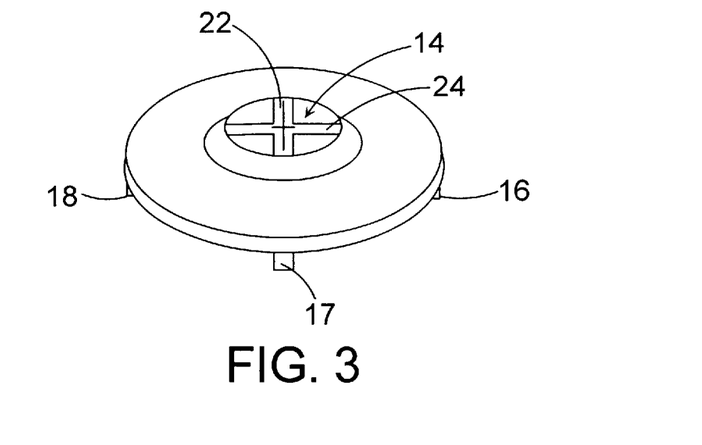
FIG. 3 is a perspective view of the first preferred embodiment of the plant anchor, shown in FIG. 1, of the present invention.
Figure 4:
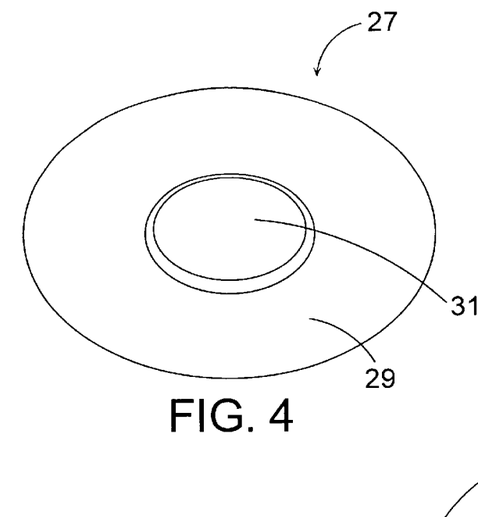
FIG. 4 is a top view of a first alternative embodiment of the plant anchor with a support portion located in the center of the base member.
Figure 5:
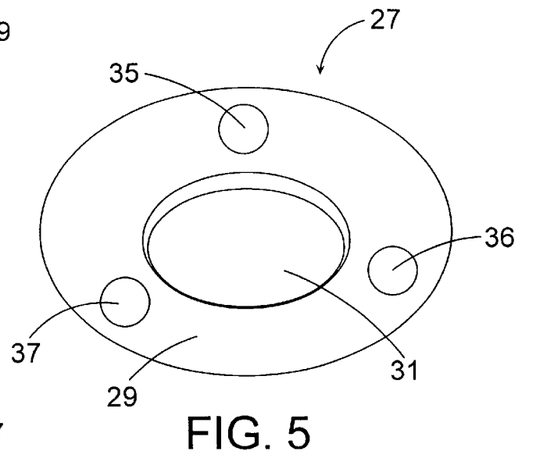
FIG. 5 is a bottom view of a first alternative embodiment of the plant anchor, as shown in FIG. 4, with a support portion located in the center of the base member as well as legs.
Figure 6:
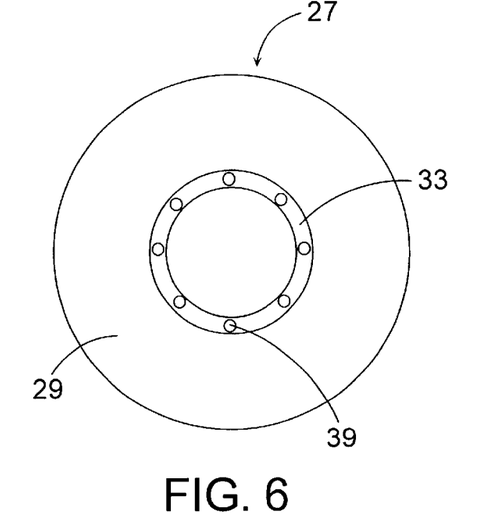
FIG. 6 is a top view of a first alternative embodiment of the plant anchor without a support portion located in the center of the base member.
Figure 7:
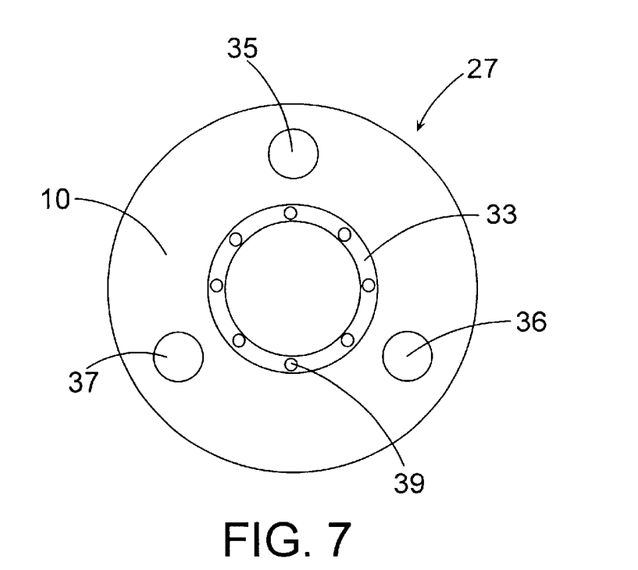
FIG. 7 is a bottom view of a first alternative embodiment of the plant anchor, as shown in FIG. 6, without a support portion located in the center of the base member as well as legs.
Figure 8:
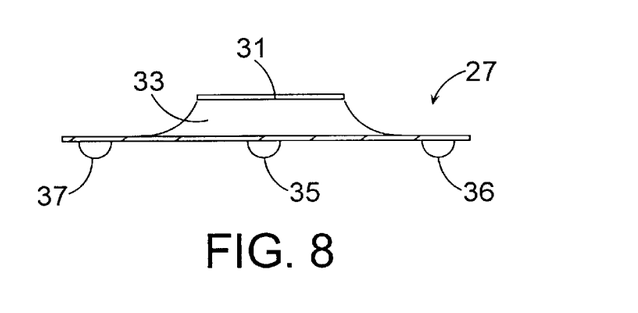
FIG. 8 is a side view of a first alternative embodiment of the plant anchor, as shown in FIG. 6, with a support portion located in the center of the base member as well as legs.
Figure 9:
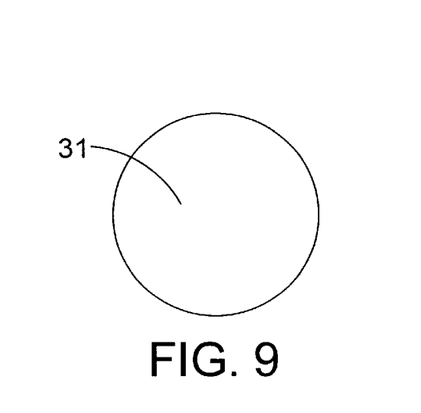
FIG. 9 is an isolated top view of the support portion of the first alternative embodiment of the plant anchor, as shown in FIGS. 4 and 5.

Referring now to the drawings, and initially to FIGS. 1, 2 and 3, which illustrate a plant anchor that is generally indicated by numeral 10. The plant anchor 10 includes a base member 12 with a support portion 14 for holding the plant in place. On the underside of the base member 12 are three legs 16, 17 and 18 for providing support to the plant anchor 10. The legs 16, 17 and 18, respectively, may optionally be rectangular while the support portion 14 and base member 12 are preferably, but not necessarily circular. The support portion 14 is preferably, but not necessarily, includes a raised or elevated portion 13 that is connected to or is preferably an integral part of the base member 12. The support portion 14 has an opening therein for supporting the plant (not shown). This opening can be of virtually any size or shape; however, the preferred opening includes a first slit 22 that is transverse to a second slit 24 with the optimal relationship being perpendicular. However, as shown in FIG. 1A, a single slit 25 can suffice. The preferred slit 22 or 24 is v-shaped to provide sufficient pliable friction without damaging the plant, however a mere slit in the form of a slice can be sufficient. The support portion 14 is preferably molded in conjunction with the base member 12 and elevated portion 13 as a unitary structure. Although the dimensions have tremendous flexibility, the optimal dimensions for the plant anchor 10 include a 2.54 centimeter (one (1) inch) diameter for the support portion 14, a 3.175 centimeter (one and one-quarter (1.25) inch) diameter for the combination elevated portion 13 and support portion 14, a 5.08 centimeter (two (2) inch) diameter for the base member 12, with the leg members 16, 17 and 18 each having a length of 0.9525 centimeters (three-eighths (⅜) of an inch) and a height of 0.3175 centimeters (one-eighth (⅛) of an inch). The height of the entire plant anchor 10 is optimally 0.9525 centimeters (three-eighths (⅜) of an inch).

In the preferred embodiment, the plant anchor 10 is preferably made of soft, flexible thermoplastic elastomer such as a styrene block copolymer compound. The preferred manufacturing process is injection molding, however, vacuum forming or thermo forming will suffice. A preferred, but nonlimiting, example of a styrene block copolymer is DYNAFLEX® G7930-1001-00, which is manufactured GLS Corporation, Thermoplastic Elastomers Division, 833 Ridgeview Drive, McHenry, Ill. 60050. DYNAFLEX® G7930-1001-00 includes 2.5 to 38% by weight of Calcium Carbonate. Styrene block copolymers of this nature are highly colorable, have outstanding grip properties, can be clear, are easily molded and are ultrasoft. DYNAFLEX® G7930-1001-00 has a specific gravity of 1.05, mold shrinkage flow of 0.026–0.030, hardness of 30, 300% modulus of 240, tensile strength of 340, elongation of 612, tear strength of 85 and a compression set of 18/36. The preferred material has also been approved by the U.S. Food and Drug Administration. Other materials can include polypropylene copolymers, however any material that can resist failure in the chemical environment of an aquarium will suffice, however the material in the support portion 14 must also be soft enough that it does not damage plants but yet provide enough pliable friction to hold the plants in a fixed position.

Referring now to FIGS. 4–9, it is also possible to make the support portion out of different material than that of the base member with this first alternative embodiment generally indicated by numeral 27. The plant anchor 27 includes a base member 29 with a support portion 31 for holding the plant in place. On the underside of the base member 29 are three legs 35, 36, and 37 respectively for providing support to the plant anchor 27. The legs 35, 36, and 37, the support portion 14 and the base member 12 are preferably, but not necessarily, circular. The support portion 31 is preferably, but not necessarily, includes a raised or elevated portion 33, that has gripping holes 39, and is connected to the base member 29. The support portion 31 is made of material that supports the plant (not shown) and must simply be soft enough not to damage plants and yet still provide good pliable friction to secure the plants. The support portion 31 is preferably attached to the base member 29 by injection molding, however, attachment of the support portion 31 to the base member 29 can occur through the application of glue or heat.

Figure 10:
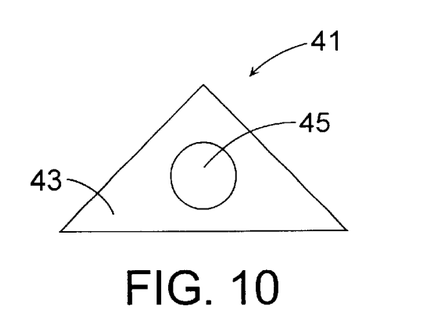
FIG. 10 is a top view of a second alternative embodiment of the plant anchor with a support portion located in the center of a triangular base member.
Figure 11:
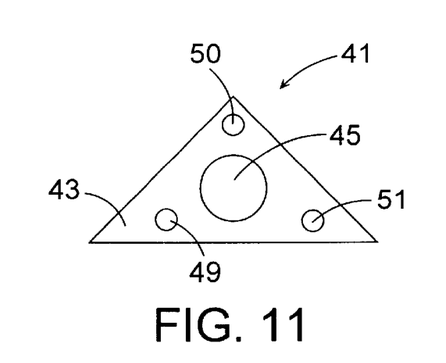
FIG. 11 is a bottom view of a second alternative embodiment of the plant anchor, as shown in FIG. 10, with a support portion located in the center of the triangular base member as well as legs.

Referring now to FIGS. 10 and 11, it is also possible to have a base member that is triangular with this second alternative embodiment generally indicated by numeral 41. The plant anchor 41 includes a base member 43 with a support portion 45 for holding the plant in place. On the underside of the base member 43 are three legs 49, 50, and 51 respectively for providing support to the plant anchor. The legs 49, 50, and 51 and the support portion 45 are preferably, but not necessarily, circular. The support portion 45 is preferably similar to support portion 14 described above.

Figure 12:
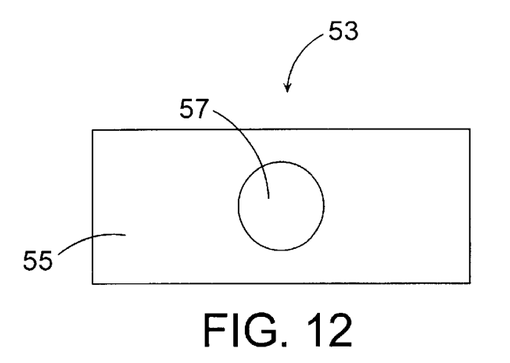
FIG. 12 is a top view of a third alternative embodiment of the plant anchor with a support portion located in the center of a rectangular base member.
Figure 13:
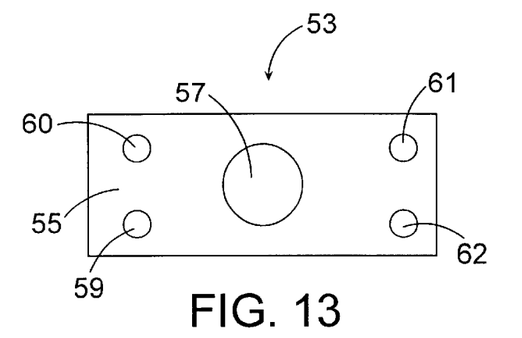
FIG. 13 is a bottom view of the third alternative embodiment of the plant anchor, as shown in FIG. 12, with a support portion located in the center of the rectangular base member as well as legs.

Referring now to FIGS. 12 and 13, it is also possible to have a base member that is rectangular with this third alternative embodiment generally indicated by numeral 53. The plant anchor 53 includes a base member 55 with a support portion 57 for holding the plant in place. On the underside of the base member 55 are four legs 59, 60, 61 and 62 respectively for providing support to the plant anchor. The legs 59, 60, 61 and 62 and the support portion 57 are preferably, but not necessarily, circular. The support portion 57 is preferably similar to support portion 14 described above.

Figure 14:
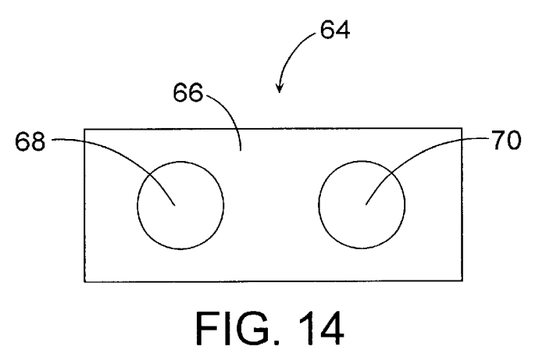
FIG. 14 is a top view of a fourth alternative embodiment of the plant anchor with dual support portions located in the rectangular base member.
Figure 15:
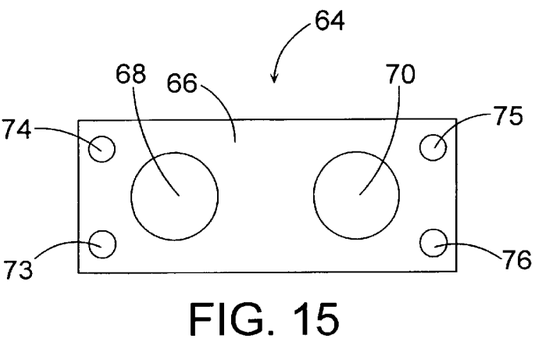
FIG. 15 is a bottom view of the fourth alternative embodiment of the plant anchor, as shown in FIG. 14, with dual support portions located in the rectangular base member as well as legs.

Referring now to FIGS. 14 and 15, it is also possible to have the rectangular base member of FIGS. 12 and 13 with two circular portions as a fourth alternative embodiment that is generally indicated by numeral 64. The plant anchor 64 includes a base member 66 with a first support portion 68 and a second support portion 70 for holding the plant in place. On the underside of the base member 64 are four legs 73, 74, 75 and 76, respectively, for providing support to the plant anchor. The legs 73, 74, 75 and 76 and the first and second support portion 68 and 70 are preferably, but not necessarily circular. The first support portion 68 and the second support portion 70 are preferably similar to support portion 14 described above.

Figure 16:
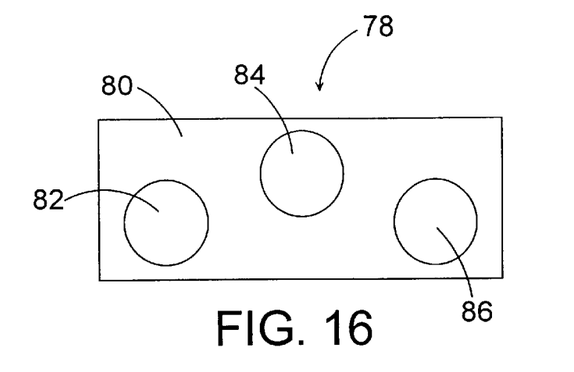
FIG. 16 is a top view of a fifth alternative embodiment of the plant anchor with three (3) support portions located in the rectangular base member.
Figure 17:
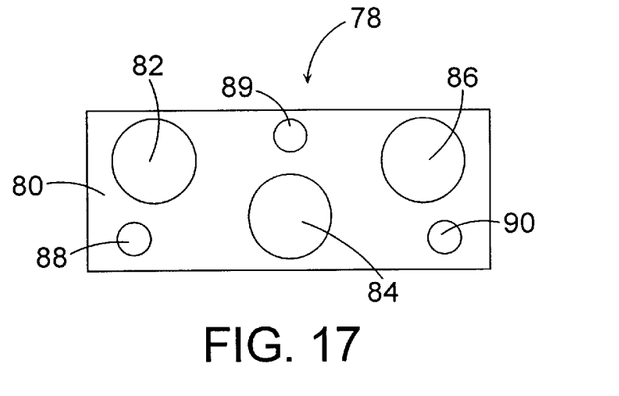
FIG. 17 is a bottom view of the fifth alternative embodiment of the plant anchor, as shown in FIG. 16, with three (3) support portions located in the rectangular base member as well as legs.

Referring now to FIGS. 16 and 17, it is also possible to have the rectangular base member of FIGS. 12 and 13 with three circular portions as a fifth alternative embodiment that is generally indicated by numeral 78. The plant anchor 78 includes a base member 80 with a first support portion 82, a second support portion 84 and a third support portion 86 for holding the plant in place. On the underside of the base member 80 are three legs 88, 89, and 90, respectively, for providing support to the plant anchor. The three legs 88, 89, and 90 and the first, second and third support portions 82, 84 and 86 are preferably, but not necessarily, circular. The first support portion 82, second support portion 84 and third support portion 84 are preferably similar to support portion 14 described above.

Figure 18:
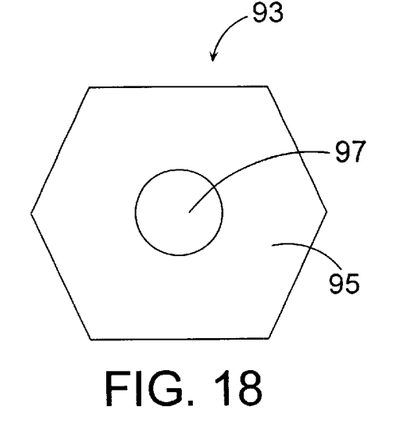
FIG. 18 is a top view of a sixth alternative embodiment of the plant anchor with a support located in a hexagonal base member.
Figure 19:
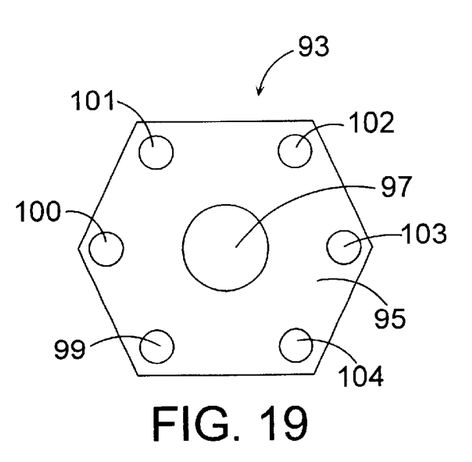
FIG. 19 is a bottom view of the sixth alternative embodiment of the plant anchor, as shown in FIG. 18, with a support portion located in the hexagonal base member as well as legs.

Referring now to FIGS. 18 and 19, it is also possible to have a base member that is polygonal, e.g., hexagon, with this sixth alternative embodiment generally indicated by numeral 93. The plant anchor 93 includes a base member 95 with a support portion 97 for holding the plant in place. On the underside of the base member 95 are six legs 99, 100, 101, 102, 103 and 104 respectively for providing support to the plant anchor. The six legs 99, 100, 101, 102, 103 and 104 and the support portion 97 are preferably, but not necessarily circular. The support portion 97 is preferably similar to support portion 14 described above.

Figure 20:
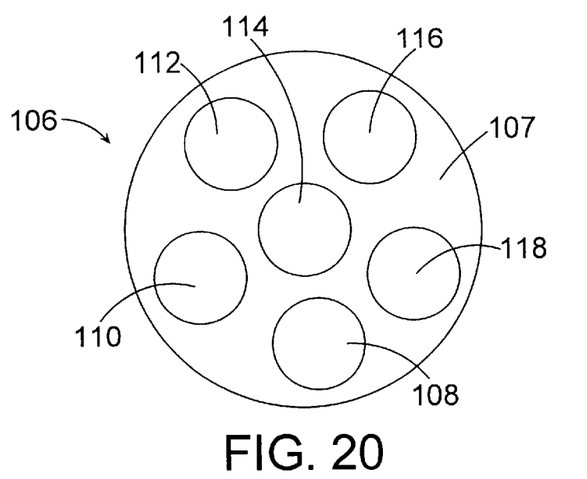
FIG. 20 is a top view of a seventh alternative embodiment of the plant anchor with six (6) support portions located in a circular base member.
Figure 21:
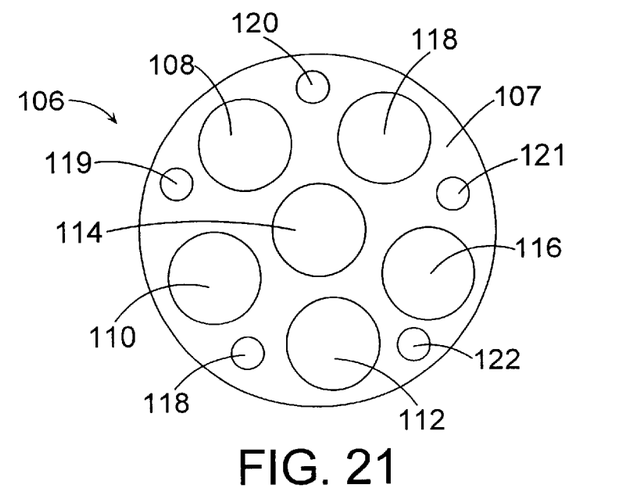
FIG. 21 is a bottom view of the seventh alternative embodiment of the plant anchor, as shown in FIG. 20, with six (6) support portions located in the circular base member as well as legs.

Referring now to FIGS. 20 and 21, it is also possible to have a circular base member with five circular support portions as a seventh alternative embodiment that is generally indicated by numeral 106. The plant anchor 106 includes a circular base member 107 with a first support portion 108, a second support portion 110, a third support portion 112, a fourth support portion 114 and a fifth support portion 116 for holding the plant in place. On the underside of the base member 107 are five legs 118, 119, 120, 121 and 122, respectively, for providing support to the plant anchor 106. The legs 118, 119, 120, 121 and 122 and the first, second, third, fourth and fifth support portions 108, 110, 112, 114 and 116, respectively, are preferably, but not necessarily circular and similar to support portion 14 described above.

Therefore, the above embodiments should not be construed as limiting in any manner with the geometric shape of the base member as well as the number and geometric shape of the support portions and legs being virtually unlimited.

Figure 22:
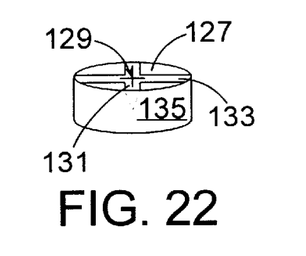
FIG. 22 is a side view of a top portion of an eighth alternative embodiment of the plant anchor with a downwardly extending sidewall forming a cap.
Figure 23:
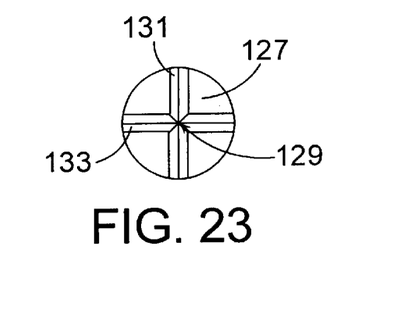
FIG. 23 is a top portion of the eighth alternative embodiment of the plant anchor, as show in FIG. 22.

An eighth alternative embodiment is the use of material held in a container to provide support for the plant in addition to a pleasing aesthetic look. Referring now to FIGS. 22–27 and initially, to FIGS. 24 and 26, this embodiment of a plant anchor is generally indicated by numeral 125 with the support member generally indicated by numeral 126. As shown in FIGS. 22 and 23, there is a top portion 127 has an opening 129 therein for supporting the plant (not shown). This opening 129 can be of virtually any size or shape; however, the preferred opening 129 includes a first slit 131 that is transverse to a second slit 133 with the optimal relationship being perpendicular. This top portion 127 preferably, but not necessarily includes a downwardly extending sidewall 135, e.g., circular, so that the support portion 127 thereby forming a cap. The optimal height of the top portion 127 is 0.635 centimeters (one-fourth (¼) of an inch) and the optimal diameter is 1.905 centimeters (three-fourths (¾) of an inch). The slits 131 and 133 are preferably v-shaped. The top portion 127 is preferably similar to support member 14 described above.

Figure 24:
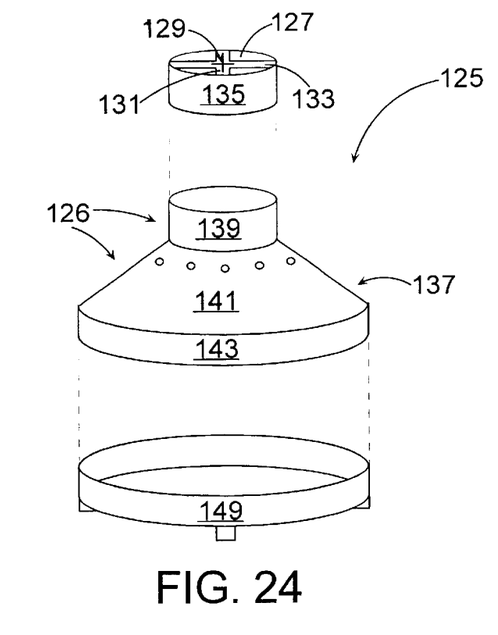
FIG. 24 is an exploded side view of the top, middle and bottom portion of the eighth alternative embodiment of the plant anchor.
Figure 25:
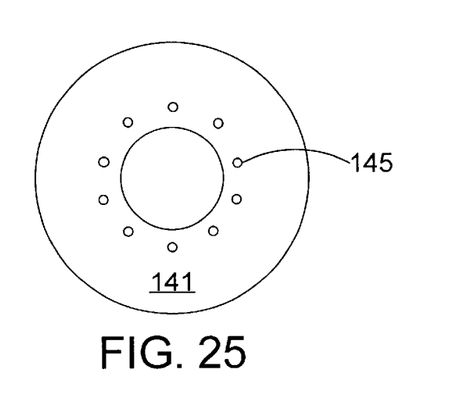
FIG. 25 is a top view of the middle portion of the eighth alternative embodiment of the plant anchor, as shown in FIG. 24 with perforated holes.

Referring now to FIGS. 24 and 25, the middle portion for the support member 126 is generally indicated by numeral 137. The middle portion 137 includes a first circular flange portion 139 that preferably, but not necessarily, fits within the downwardly extending sidewall 135, e.g. circular, of the top portion 127, however, the sidewall 135 could also fit around the outside of the first flange portion 139, e.g. circular. From the circular flange portion 139, the container has a middle portion 141, e.g. frustoconical, which preferably projects outward towards the bottom. Once again, although this structure is preferred, it is not necessary. The middle portion 141 terminates in a second circular flange portion 143 that preferably, but not necessarily, has a larger diameter than the first circular flange portion. Located on the sides of the middle portion 141 are air holes 145 that preferably, but not necessarily, are 0.15875 centimeters (one-sixteenth (1/16) of an inch).

Figures 26, 27:
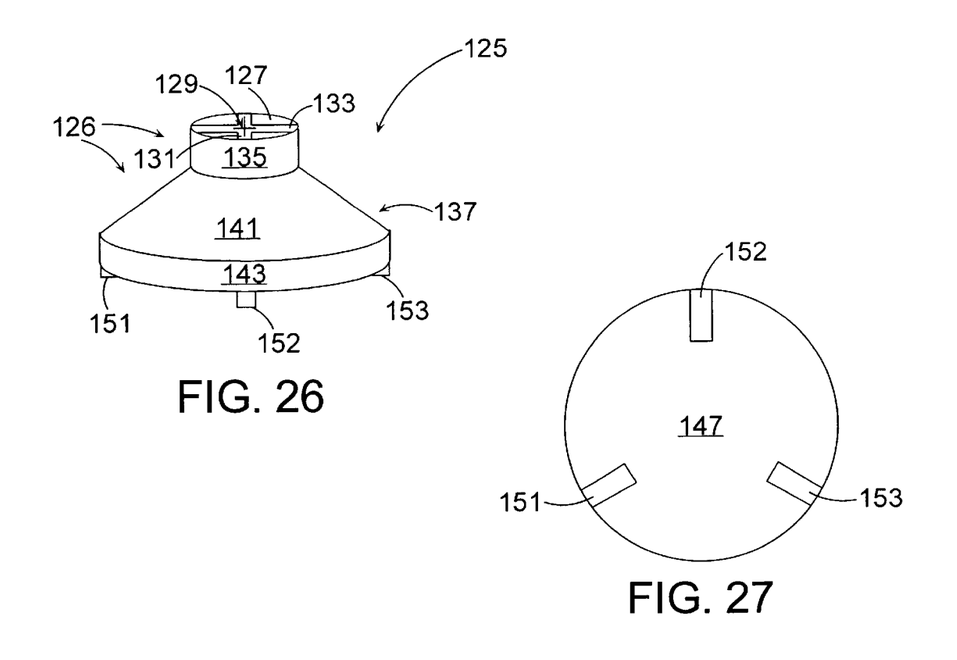
FIG. 26 is a side view of the top, middle and bottom portion of the eighth alternative embodiment of the plant anchor.
FIG. 27 is a bottom view of the bottom portion of the eighth alternative embodiment of the plant anchor, as shown in FIG. 26.

Referring now to FIGS. 26 and 27, the bottom portion 147, e.g. circular, has an upwardly extending sidewall 149, as shown in FIG. 24, that securely fits around the second flange portion 143 of the middle portion 141. However, the upwardly extending sidewall 149, as shown in FIG. 24, could just as easily fit within the second flange portion 143 of the middle portion 141. On the underside of the bottom portion 147 are three legs 151, 152 and 153 respectively for providing support to the plant anchor. The legs 151, 152 and 153 are preferably, but not necessarily rectangular.

Figure 28:
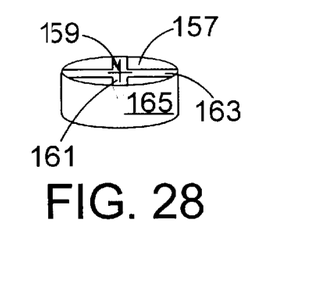
FIG. 28 is a side view of a top portion of an ninth alternative embodiment of the plant anchor with a downwardly extending sidewall forming a cap.
Figure 29:
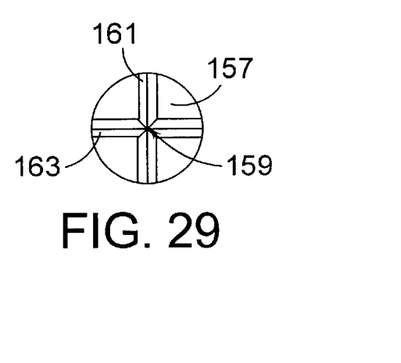
FIG. 29 is a top view of a top portion of the ninth alternative embodiment of the plant anchor, as shown in FIG.28.

A ninth alternative embodiment is the use of material held in a container to provide support for the plant in addition to a pleasing aesthetic look. Referring now to FIGS. 28–33 and initially, to FIGS. 30 and 32, this embodiment of a plant anchor is generally indicated by numeral 155 with the support member generally indicated by numeral 156. As shown in FIGS. 28 and 29, there is a top portion 157 has an opening 159 therein for supporting the plant (not shown). This opening 159 can be of virtually any size or shape; however, the preferred opening 159 includes a first slit 161 that is transverse to a second slit 163 with the optimal relationship being perpendicular. This top portion 157 preferably, but not necessarily includes a downwardly extending sidewall 165, e.g., circular, so that the support portion 157 thereby forming a cap. The optimal height of the top portion 157 is 0.635 centimeters (one-fourth (¼) of an inch) and the optimal diameter is 1.905 centimeters (three-fourths (¾) of an inch). The slits 161 and 163 are preferably v-shaped. The top portion 157 is preferably similar to support member 14 described above.

Figure 30:
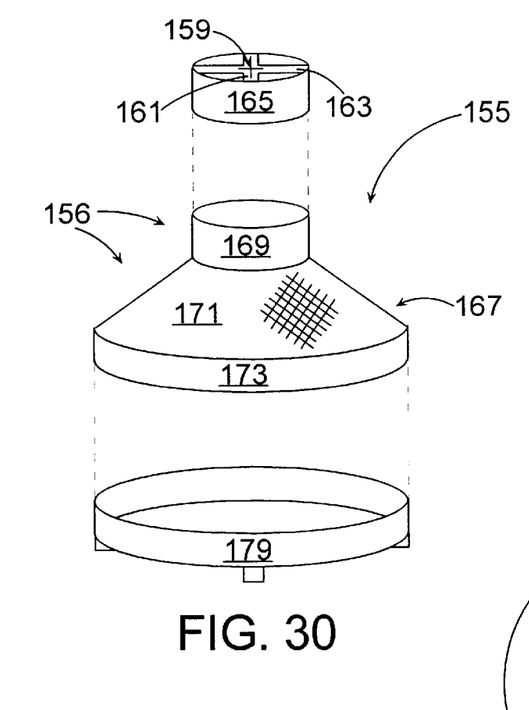
FIG. 30 is an exploded side view of the top, middle and bottom portion of the ninth alternative embodiment of the plant anchor.
Figure 31:
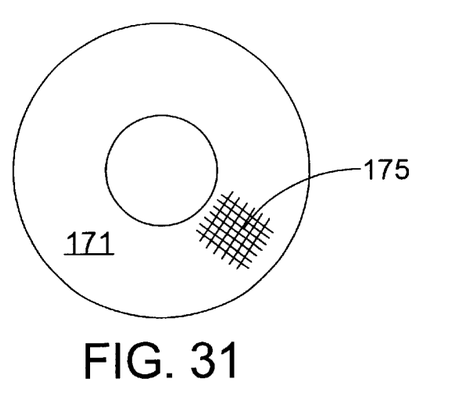
FIG. 31 is a top view of the middle portion of the ninth alternative embodiment of the plant anchor, as shown in FIG. 30 with a mesh screen.

Referring now to FIGS. 30 and 31, the middle portion for the support member 156 is generally indicated by numeral 167. The middle portion 167 has includes a first circular flange portion 169 that preferably, but not necessarily fits within the downwardly extending sidewall 165, e.g. circular, of the top portion 157, however, the sidewall 165 could also fit around the outside of the first flange portion 169, e.g., circular. From the circular flange portion 169, the container has a middle portion 171, e.g. conical, which preferably projects outward towards the bottom. Once again, although this structure is preferred, it is not necessary. The middle portion 171 terminates in a second circular flange portion 173 that preferably, but not necessarily, has a larger diameter than the first circular flange portion. Located on the sides of the middle portion 171 is a mesh 175 that preferably, but not necessarily has openings of 0.15875 centimeters (one-sixteenth (1/16) of an inch).

Figures 32, 33:
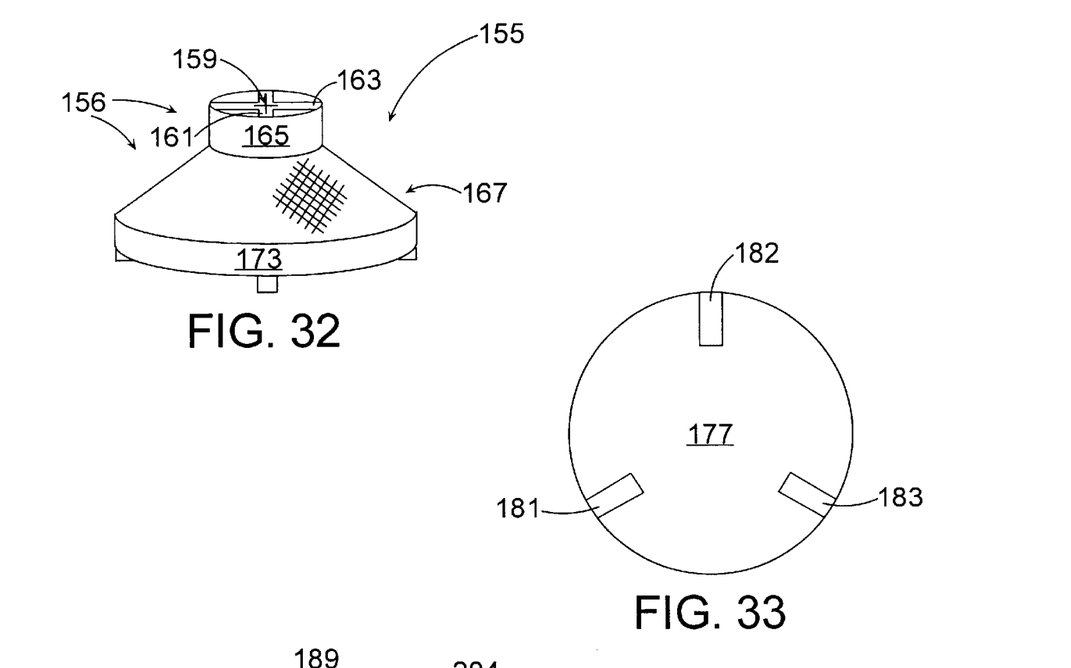
FIG. 32 is a side view of the top, middle and bottom portion of the ninth alternative embodiment of the plant anchor.
FIG. 33 is a bottom view of the bottom portion of the ninth alternative embodiment of the plant anchor, as shown in FIG. 32.

Referring now to FIGS. 32 and 33, the bottom portion 177, e.g. circular, as an upwardly extending sidewall 179, as shown in FIG. 30, that securely fits around the second flange portion 173 of the middle portion 171. However, the upwardly extending sidewall 179, as shown in FIG. 30, could just as easily fit within the second flange portion 173 of the middle portion 171. On the underside of the bottom portion 177 are three legs 181, 182 and 183 respectively for providing support to the plant anchor. The legs 181, 182 and 183 are preferably, but not necessarily rectangular.

Figure 34:
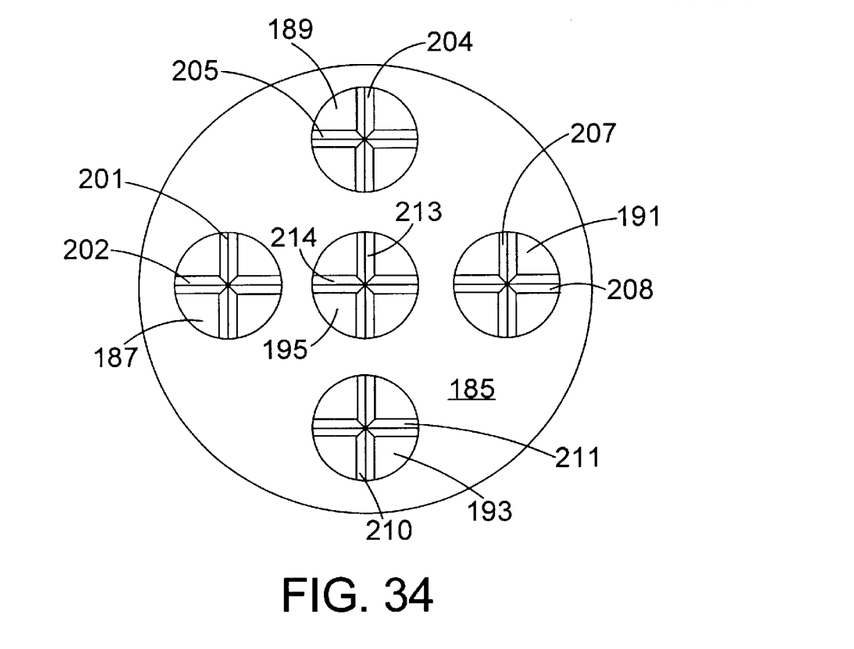
FIG. 34 is an alternative embodiment of a top portion of the eighth alternative embodiment of the plant anchor, as shown in FIG. 22, where there are five (5) support portions instead of a unitary support portion.

Another embodiment of the top portion 127 and 157 shown in FIGS. 22, 23, 28 and 29, respectively includes support portion 185, as shown in FIG. 34, includes five openings 187, 189, 191, 193 and 195, respectively. Opening 187 can be of virtually any size or shape; however, the preferred opening 187 includes a first slit 201 that is transverse to a second slit 202 with the optimal relationship being perpendicular. Opening 189 can be of virtually any size or shape; however, the preferred opening 189 includes a first slit 204 that is transverse to a second slit 205 with the optimal relationship being perpendicular. Opening 191 can be of virtually any size or shape; however, the preferred opening 191 includes a first slit 207 that is transverse to a second slit 208 with the optimal relationship being perpendicular. Opening 193 can be of virtually any size or shape; however, the preferred opening 193 includes a first slit 210 that is transverse to a second slit 211 with the optimal relationship being perpendicular. Opening 195 can be of virtually any size or shape; however, the preferred opening 195 includes a first slit 213 that is transverse to a second slit 214 with the optimal relationship being perpendicular. All of the slits 201, 202, 204, 205, 207, 208, 210, 211, 213 and 214 are preferably v-shaped. The application can also be utilized in water gardens as well as aquariums. The five openings 187, 189, 191, 193 and 195 are preferably similar to support portion 14 described above.

The middle portions 141 and 171 house a planting medium for plants. Preferably, this includes some clay so that the planting material will not leave either the holes 145 or the mesh 175 and enter either the aquarium or the water garden. Pet litter is one source of this clay. Root starter for plants can be utilized to further develop the plants.

INDUSTRIAL APPLICABILITY

The present invention is advantageously applicable in allowing plants to be held with pliable friction in a water-filled environment, e.g. aquarium or water gardens. However, a waterless environment may be utilized with this invention to provide vertical support for starter plants. This plant anchor 10 resists failure in the chemical environment of an aquarium will not damage plants and yet will hold the plants firmly in position. A significant advantage is that the legs 16, 17, 18, as shown in FIG. 2, will allow the underground filter system in an aquarium to operate and function properly and not obstruct the flow of water. Another advantage is that the present invention is inexpensive to manufacture as well as purchase. Yet another advantage is that either a single plant can be held or multiple plants by the same plant anchor.

In addition, artificial plants can also be utilized with this plant anchor 10. The associated shape and size of the plant anchor 10, the base member 12, support portion 14 and legs can infinitely vary with almost any permutation of geometric shape, size and configuration possible. The above advantages are only for the purposes of illustration and are not intended to limit the present invention as such. It will be recognizable, by those skilled in the art, that the present invention is suitable for a plurality of other applications.

In view of the foregoing, it is readily apparent that the subject support device in a very simple and effective manner allows the use of plants in aquariums and water gardens under conditions where chemicals and underwater filtration systems may be present. This allows the individual all the benefits of aquatic scenery including providing a habitat for fish, provide protective cover for smaller fish, remove waste materials and provide oxygen.

Other aspects, objects and advantages of the present invention can be obtained from a study of the drawings, the disclosure and the appended claims.

What is claimed is:

1. A plant anchor for securing a plant comprising:

a base member;

a top portion having at least one support portion located within said base member and having an opening for frictionally securing a plant and a downwardly extending sidewall;

a middle portion having an upper flange portion and a lower flange portion; and a bottom portion with an upwardly extending sidewall wherein said downwardly extending sidewall of said top portion removedly engages said upper flange of said middle portion and said lower flange portion of said middle portion removedly engages said upwardly extending sidewall of said bottom portion.

2. The plant anchor, as set forth in claim 1, wherein said middle portion is conical with said upper flange portion having a smaller diameter than said bottom flange portion.

3. The plant anchor, as set forth in claim 1, wherein said top portion is circular and said bottom portion is circular.

4. The plant anchor, as set forth in claim 1, wherein said middle portion includes a series of holes.

5. The plant anchor, as set forth in claim 1, wherein said middle portion includes a mesh.

6. The plant anchor, as set forth in claim 1, wherein said middle portion can store a planting medium therein.

7. The plant anchor, as set forth in claim 1, wherein said top portion and said bottom portion includes thermoplastic elastomer and said middle portion includes polystyrene.

8. A plant anchor for securing a plant comprising:

a base member having a top portion having at least one support portion having an opening for frictionally securing a plant and a downwardly extending sidewall, a middle portion having an upper flange portion and a lower flange portion, and a bottom portion with an upwardly extending sidewall wherein said downwardly extending sidewall of said top portion removedly engages said upper flange of said middle portion and said lower flange portion of said middle portion removedly engages said upwardly extending sidewall of said bottom portion; and at least one support portion located within said base member and each said at least one support portion includes at least one opening for frictionally securing a plant.

9. A plant anchor for securing a plant in a water-filled environment and comprising:

a frustoconical member having opposite ends;

a flexible end member at one end of the frustoconical member; the frustoconical member having open end at the end opposite said flexible end member;

the flexible end member having at least one slit therein through which a plant may be passed and the flexible end portion being constructed and arranged to provide a pliable friction to the plant to hold the plant in place; the slit being smaller than said open end of the frustoconical member.

10. The plant anchor, as set forth in claim 9, wherein each said at least one slit includes a v-shaped cut.

11. The plant anchor, as set forth in claim 9, wherein the at least one slit is a pair of slits located transversely to each other.

12. The plant anchor, as set forth in claim 11, wherein the pair of slits are substantially perpendicular to each other.

13. The plant anchor, as set forth in claim 9, wherein the members include a thermoplastic elastomer.

* * * * *